United States Patent Office 3,269,799
Patented August 30, 1966

3,269,799
TREATMENT OF PIGMENTARY SILICA
Elton F. Gunn, Jr., Monroe, La., assignor to Columbian Carbon Company, New York, N.Y., a corporation of Delaware
No Drawing. Filed May 10, 1965, Ser. No. 454,704
6 Claims. (Cl. 23—182)

The present invention provides a method for beneficially altering the physical chemical properties of halogen-containing amorphous silicon dioxide pigments.

It is known in the art to manufacture amorphous colloidal silicon dioxide, herein sometimes called "silica" for brevity, by hydrolyzing vapors of a silicon halide within a reaction chamber containing sufficient water vapor and maintained at a suitably high temperature to effect hydrolysis substantially completely within the vapor phase, the products of hydrolysis being silica and an acid halide. According to particularly effective embodiments of processes of this type, a mixture comprising an oxygen-containing gas and a hydrogen-containing fuel is burned to produce heated gases, including water vapor, which are mixed with the silicon halide vapors within the reaction chamber to effect the hydrolysis reaction.

The silicon halide employed in these processes may, with advantage, be silicon tetrafluoride or silicon tetrachloride, although other silicon halide compounds which are normally in vapor form or are readily vaporizable may be used.

The amorphous silica obtained from the vapor phase hydrolysis of a silicon halide is a dry, flocculent, impalpable powder characterized by a mean particle diameter of from about 5 to 30 millimicrons, a surface area (B.E.T.) exceeding about 100 m.$^2$/g., and a bulk density of about 1 to 2 pounds per cubic foot. Furthermore, the product is distinctly acidic in nature because of a significant halogen content and the presence of acidic groups on the surface of the particles. The halogen content of amorphous silica is usually at least about 1% by weight of the silica and may be as high as 3%, by weight, or higher. Halogen-containing amorphous silica is characterized by poor reinforcement of rubber compounds, poor dispersability in resins and plastics, hydrophobia, and a pronounced tendency to assume static electric charges, which causes excessive fly loss of the silica upon dry milling with rubber.

The acidic nature of amorphous silica may be readily determined by titration with basic reagents, for example aqueous sodium hydroxide. Even though the silica may be treated to completely remove or negate its halogen content, it still exhibits a distinctly acid property due to the presence of acidic surface groups.

It has previously been proposed to improve the performance of amorphous silica in rubber, plastics, resins, paints and the like, by substantially completely neutralizing or removing the acidity of the silica due to the presence of combined halogen. For example, it has been proposed to heat treat the silica at a temperature within the range of about 400° F. to 1,200° F., optionally in the presence of steam, air or a halogen-reactive gas, thereby liberating the halogen content thereof. It has also been proposed to completely neutralize the halogen content of silica by contacting the particles with organic amines or aqueous solutions of inorganic bases.

Each of these treatments heretofore suggested have not proved entirely satisfactory, and in some cases actually degrades the quality of the silica. For example, heat treatment may cause sintering of the silica particles, thereby forming hard, grainy aggregates which cannot be satisfactorily dispersed in rubber and other vehicles. Likewise, treatment with organic bases, e.g. alkali hydroxide and NH$_4$OH in the aqueous phase following by drying, results in accretion of the silica particles, and deleteriously affects dispersability. Treatment with organic amines, either in the vapor phase or in organic solution, is also subject to a number of practical objections.

Furthermore, each of the previously proposed treatment methods is conducted in a manner such that the halogen content of the silica is substantially completely neutralized or removed.

I have now found that treatment of amorphous, halogen-containing silica with vapors of ammonia in the substantial absence of water in the liquid phase and at a temperature below that at which the halogen content of the silica is substantially removed, i.e., below about 250° F., avoids the sintering and accretion of the silica particles characteristic of other treating methods. I have further found that substantial improvements in the properties of halogen-containing silica in rubber and other applications may be obtained by carrying out this treatment process in such a manner that the amount of ammonia caused to combine with the silica is significantly less than that required to completely neutralize the acidity of the silica due to combined halogen.

In accordance with the preferred embodiment of the invention, amorphous silica containing at least 1% halogen by weight, and preferably not more than about 3%, is treated with ammonia vapors under conditions such that from about 1/10 to about 2/3 of the halogen content is neutralized. The amount of vaporous ammonia caused to combine with the silica to effect the desired degree of neutralization is primarily dependent on both the contacting temperature and the halogen content of the silica, but generally is within the range of from about 0.01 to about 0.10 gram per gram of silica. This is not to say that the stated amounts of ammonia and silica actually combine, but rather that when the treating ratio of ammonia to silica is within the above-noted range, the desired degree of neutralization of the halogen content of the silica may be obtained. However, greater or lesser ammonia:silica treating ratios may be employed where indicated.

The temperature at which the silica and ammonia are contacted should be below about 250° F., and more preferably below about 125° F. Conveniently, the treatment is carried out at ambient temperatures. The duration of treatment is subject to wide variation, but in general is on the order of minutes or seconds.

As previously noted, it is one requirement of the invention that the treatment of the silica with ammonia vapors be carried out in the absence of water in the liquid phase. Thus, the silica may be treated with anhydrous ammonia in the essentially dry, flocculent state in which it is obtained after collection. It is also within the scope of the invention to treat substantially dry silica with a vapor mixture comprising ammonia and water, provided that the contacting temperature is above the dew point of water so as to preclude condensation on the silica, thereby preventing formation of the aforementioned undesirable accretions. Vapor mixtures of this type may, for example, be obtained by decomposing ammonium carbonate.

Various means may be employed for uniformly exposing the silica particles to the ammonia vapors. For example, the particulate silica may be treated with ammonia in static or mechanically agitated beds, or in a fluidized bed by utilizing suitable equipment that will be readily apparent to those skilled in the art.

As previously noted, acidity of amorphous silica is due to both the combined halogen content of the silica and the inherent acidic nature of the silica surface. When an aqueous dispersion of halogen-containing amorphous silica (e.g., 5 grams per 100 ml. of water) is titrated with NaOH (e.g., a 1 N solution), the milliliters of NaOH required for neutralization is representative of the total acidity of the silica. If the silica is heat treated so as to completely remove its halogen content, and is subsequently subjected to the same neutralization test, the milliliters of NaOH solution required for neutralization is indicative of the inherent acidic nature of the silica surface due to the presence of acdic groups. The difference between the quantity of NaOH required to neutralize the total acidity of halogen-containing silica and that required to neutralize halogen-free silica is, of course, indicative of the acidity due to combined halogen. In accordance with the preferred embodiment of the present invention, amorphous halogen-containing silica is contacted with ammonia to only partially neutralize this acidity due to combined halogen, and preferably to neutralize from about $\frac{1}{10}$ to $\frac{2}{3}$ thereof.

At the present time it is not known whether the mechanism by which ammonia combines with halogen-containing silica in accordance with the invention is adsorption, reaction with halogen, or some other surface-chemical phenomenon. However, regardless of the actual combining mechanism, amorphous, halogen-containing silica treated in accordance with the invention to partially neutralize the halogen content thereof has a number of distinct advantages over both untreated amorphous silica and silica which has been treated so as to substantially completely neutralize or remove its halogen content. For example, the treated silica provided by the invention imparts improved properties to rubber compounds, particularly improve tensile strength and shortened cure time. Furthermore, it may be more readily incorporated into rubber by dry milling, with only negligible fly loss. Due to enhanced hydrophilic characteristics compared to untreated silica, the product provided by the invention may also be used with advantage in the manufacture of paper sizing compounds, water-based paints, etc., and may be conveniently compounded with rubber by well-known latex masterbatching procedures.

The invention will now be further described with reference to the following specific example, which is given solely for illustrative purposes and is not to be construed as being limitative.

EXAMPLE

A dry, flocculent, amorphous silica was produced by hydrolyzing silicon tetrafluoride at about 2,500° F. within combustion gases produced by burning a hydrocarbon fuel with air. The silica particles so formed suspended within the hot combustion gases to form an aerosol, which was subsequently cooled and separated at about 500° F. to recover the silica.

The silica was found to have a mean particle diameter of 15 m$\mu$, a B.E.T. surface area of 143 sq. meters per gram, a bulk density of 1.5 pounds per cubic foot, a fluorine content of 1.75% by weight, and a total moisture

*Ammonia treatment—Run No. 1*

1361 grams of the fluorine-containing silica was placed in an opentop, cylindrical ammonia treating vessel having dimensions of about 12″ inside diameter and 48″ length, and equipped with a porous gas distribution plate at its bottom to facilitate thorough contacting of the silica with the amomnia gas.

190 grams of ammonia carbonate was placed in a closed container connected to the treating vessel by means of an extended metal conduit having a moisture trap installed immediately ahead of the treating vessel. The container was then slowly heated to a temperature of about 250° F. to decompose to ammonium carbonate, the vapor mixture of ammonia, carbon dioxide and water vapor thereby obtained being passed to the treating vessel. Heating of the ammonium carbonate at 250° F. was continued for a period of about 10 minutes to effect complete decomposition.

The amount of ammonia passed to the treating vessel was approximately 61 grams, and the ammonia:silica treating ratio was therefore approximately 0.045:1. The temperature within the treating vessel rose to a maximum of 120° F. during treatment. There was no noticeable moisture accumulation within the treating vessel during treatment.

*Ammonia treatment—Run No. 2*

1361 grams of the fluorine-containing silica was placed in a treating vessel, and anhydrous ammonia was passed into the treating vessel through the porous gas distribution plate at a rate of 8 g./minute for five minutes. The ammonia:silica treating ratio was therefore 0.029:1, and the average temperature within the treating vessel was about 90° F.

*Testing.*—The ammonia treated silicas of Runs 1 and 2 were found to be still flocculent, dry and virtually unchanged in bulk density. Practically no deleterious accretions were observed by light microscope examination. The fluorine contents of the ammonia treated silicas were found to be substantially the same as the untreated parent, namely, 1.70% by weight of the silica of Run No. 1 and 1.73% by weight of the silica of Run No. 2.

The ammonia treated silicas were packaged in paper bags and stored in a warehouse for two weeks at normal atmospheric conditions. Thereafter, the treated silicas were comparatively tested against the untreated parent silica and against a portion of the partent silica that was heat treated at 1700° F. for 30 minutes in closed boats in an atmosphere of air for the purpose of substantially completely removing its fluorine content. The fluorine content of the heat treated silica was found to be 0.005% by weight.

For the purpose of determining the amount of fluorine content neutralized as a result of ammonia treatment, five grams of each of the silicas was dispersed in 100 ml. of distilled water, and the the resultant slurries were titrated to neutrality with a 1N NaOH solution using a pH meter. The volume of NaOH solution required to neutralize each slurry is shown in the fololwing table:

TABLE I

| Slurry: | Ml. of 1 N NaOH required for neutralization |
|---|---|
| Untreated parent silica | 5.3 |
| Ammonia treated silica—Run No. 1 | 4.0 |
| Ammonia treated silica—Run No. 2 | 3.9 |
| Heat treated parent silica | 1.3 |

The difference between the ml. of NaOH required to neutralize the untreated parent and that required to neutralize the substantially fluorine-free, heat treated silica (4.0 ml.) is representative of the acidity due to combined fluorine neutralized as a result of the ammonia treatment may be obtained from the formula:

$$X = 100 - \left(\frac{A}{B}\right)$$

X represents the percent acidity due to combined fluorine that is neutralized by ammonia treatment;

A is ml. of NaOH required to neutralize ammonia treated silica minus ml. of NaOH required to neutralize fluorine-free, heat treated silica; and B is ml. of NaOH required to neutralize the untreated parent silica minus ml. of NaOH required to neutralize fluorine-free, heat-treated silica.

By calculation, it can be seen that the ammonia treatment of Run No. 1 neutralized about 42% of the fluorine content of the silica and the treatment of Run No. 2 neutralized about 35% of the fluorine content.

For the purpose of determining the relative hydrophilic characteristics of the silicas, 0.25 g. samples of each were gently added to the surface of a body of distilled water contained in test tubes having a diameter of 30 mm. The silicas were not stirred or agitated, but were allowed to wet of their own accord. Wetting was considered complete when all of the sample had submerged below the surface of the water. Wetting times were as follows:

TABLE 2

| | Wetting time (seconds) |
|---|---|
| Untreated parent silica | 900 |
| Ammonia treated silica—Run No. 1 | 70 |
| Ammonia treated silica—Run No. 2 | 60 |
| Heat treated parent silica | 90 |

As can be readily seen, the silicas treated in accordance with the invention, wherein only a portion of the halogen content is neutralized, were relatively more hydrophilic than the untreated parent silica and the parent that was heat-treated to remove its halogen content.

To determine rubber properties, portions of the ammonia treated silicas of Runs 1 and 2, as well as the heat treated and the untreated parent silicas, were compounded with natural rubber by conventional dry mixing procedures on a two-roll mill. Also included in this test for the purpose of comparison was a silica sample prepared by slurrying 1361 g. of the untreated parent with an aqueous ammonium hydroxide solution (prepared by dissolving 40 g. of ammonia in 7 gallons of water), followed by filtering and drying. The silica treated with aqueous ammonium hydroxide in this manner differed substantially from the ammonia vapor-treated silicas of Runs 1 and 2 in that it was characterized by a bulk density of about 20 pounds per cubic foot, contained excessive accretions and was no longer flocculent. These accretions could not be satisfactorily dispersed in rubber, even upon severe milling.

Also included for comparative purposes was a sample of the ammonia treated silica of Run 1 which was subsequently heat treated for one hour at a temperature above 250° F.

Compared to the untreated parent silica, the heat-treated parent and the heat-treated, ammonia treated silica, the amonia treated silicas of Runs 1 and 2 incorporated into natural rubber much more quickly. Twenty to thirty minutes were required to dry mix and homogenize the untreated and treated silicas, compared to five minutes or less required for the silicas of Runs 1 and 2. Furthermore, fly loss was reduced to an estimated 1% by weight of the ammonia vapor-treated silicas, as opposed to an estimated 2% to 5% experienced with the untreated and heat-treated parent silicas.

The rubber compounding recipe and the physical properties of the stocks cured at 285° F. were as follows:

TABLE 3

| Recipe: | Parts by weight |
|---|---|
| Natural rubber—smoked sheets | 100.0 |
| Silica | 55.0 |
| Zinc oxide | 5.0 |
| Stearic acid | 3.0 |
| Phenyl-B-naphthalene | 1.0 |
| Benzothiazyl disulfide | 1.0 |
| Diorthotolylguanidine | 1.5 |
| Sulfur | 3.0 |

| Silica | Cure Time (min.) | Modulus L-300 (p.s.i.) | Tensile (p.s.i.) | Elong. (percent) | Shore Hardness | Percent Reb. at 60 Cure |
|---|---|---|---|---|---|---|
| Untreated Parent | 15 | 670 | 1,450 | 495 | 83 | 52.0 |
|  | 40 | 980 | 1,950 | 480 | 86 |  |
|  | 80 | 920 | 2,150 | 548 | 87 |  |
| Ammonia Treated Silica Run No. 1. | 15 | 1,105 | 3,400 | 585 | 75 | 60.5 |
|  | 40 | 1,215 | 3,450 | 580 | 81 |  |
|  | 80 | 1,215 | 3,300 | 575 | 84 |  |
| Ammonia Treated Silica Run No. 2. | 15 | 1,110 | 3,600 | 610 | 77 | 59.0 |
|  | 40 | 1,240 | 3,550 | 595 | 81 |  |
|  | 80 | 1,045 | 4,200 | 595 | 83 |  |
| Heat-treated Parent Silica | 15 | 640 | 2,550 | 585 | 72 | 59.5 |
|  | 40 | 857 | 2,875 | 565 | 77 |  |
|  | 80 | 765 | 3,470 | 665 | 85 |  |
| Aqueous NH4OH Treated Silica | 15 | 935 | 1,300 | 360 | 78 | 59.0 |
|  | 40 | 1,155 | 1,650 | 390 | 82 |  |
|  | 80 | 1,110 | 1,800 | 420 | 85 |  |
| Heated-treated Silica-Run No. 1 | 15 | 160 | 800 | 810 | 77 | 56.4 |
|  | 40 | 585 | 2,200 | 635 | 78 |  |
|  | 80 | 725 | 2,250 | 620 | 80 |  |

It can readily be seen from the above data that the silicas treated with ammonia vapors in accordance with the present invention imparted the fastest cure rate and the best combination of physical properties to rubber. More specifically, compared to the untreated parent, the silicas of Runs 1 and 2 imparted higher tensile strength, elongation, modulus and rebound properties to natural rubber. Compared to the heat-treated parent silica, the silicas of Runs 1 and 2 developed equivalent or better tensile properties and markedly higher modulus. Furthermore, the silicas of Runs 1 and 2 developed higher modulus and markedly higher tensile strengths compared to the silica that was treated with aqueous ammonium hydroxide. In addition, the ammonium hydroxide treated silica imparted a lower tensile strength to natural rubber than did the untreated parent, probably due to the multitudinous accretions formed during treatment. Furthermore, it should also be noted that subsequent heat-treatment of the ammonia treated silica of Run No. 1 substantially negated the improvements afforded by the present invention. Thus, compared to the ammonia treated silica of Run No. 1, rubber stocks compounded with the heat-treated sample were characterized by markedly reduced tensile, modulus and rebound properties.

It will, of course, be understood that various changes may be made in materials, procedures, conditions and the like, which have been used to describe the invention, without deaprting from the spirit or scope as expressed in the appended claims.

I claim:
1. Method for treating particulate, amorphous silicon dioxide having an acidic halogen content which comprises contacting the particulate halogen-containing silicon dioxide in a substantially dry state with ammonia vapor in the substantial absence of water in the liquid phase and at a temperature below that at which the halogen content of the silicon dioxide is substantially removed, whereby the physical and chemical properties of the sili- con dioxide are altered without sintering and accretion of the particles.

2. Method as in claim 1 wherein the silicon dioxide is contacted with ammonia vapor at a temperature below about 250° F.

3. Method as in claim 1 wherein said ammonia vapor is anhydrous ammonia.

4. Method as in claim 2 wherein the contacting temperature is below about 125° F.

5. Method for treating particulate, amorphous silicon dioxide having an acidic halogen content which comprises contacting the particulate halogen-containing silicon dioxide in a substantially dry state with ammonia vapor in the substantial absence of water in the liquid phase and at a temperature below that at which the halogen content of the silicon dioxide is substantially removed, the amount of ammonia vapor caused to contact said silicon dioxide and said contacting temperature being such that said ammonia is combined with said silicon dioxide in an amount significantly less than that required to completely neutralize the acidity due to said halogen content, whereby the physical and chemical properties of the silicon dioxide are altered without sintering and accretion of the particles.

6. Method as in claim 5 wherein said amorphous silicon dioxide has a halogen content of from about 1% to 3% by weight and is treated at a temperature below about 250° F. with an amount of ammonia sufficient to neutralize from about $\frac{1}{10}$ to about $\frac{2}{3}$ of the acidity due to said halogen content.

References Cited by the Examiner
UNITED STATES PATENTS 2,625,492  1/1953  Young _____ 252—441 XR MILTON WEISSMAN, *Primary Examiner.*

MAURICE A. BRINDISI, *Examiner.*

H. S. MILLER, *Assistant Examiner.*